(12) United States Patent
Jazkewitsch et al.

(10) Patent No.: US 9,346,919 B2
(45) Date of Patent: May 24, 2016

(54) POLYSILOXANE-POLYETHER COPOLYMERS WITH AMINO GROUPS AND/OR QUATERNARY AMMONIUM GROUPS IN THE POLYETHER MOIETY AND PROCESSES FOR THE PREPARATION THEREOF

(71) Applicant: Evonik Industries AG, Essen (DE)

(72) Inventors: Olga Jazkewitsch, Essen (DE); Frank Schubert, Neukirchen-Vluyn (DE); Michael Fiedel, Essen (DE); Frank Koenig, Gelsenkirchen (DE); Dirk Kuppert, Aschaffenburg (DE)

(73) Assignee: Evonik DeGussa GmbH, Essen (DE)

( * ) Notice: Subject to any disclaimer, the term of this patent is extended or adjusted under 35 U.S.C. 154(b) by 0 days.

(21) Appl. No.: 14/218,223

(22) Filed: Mar. 18, 2014

(65) Prior Publication Data
US 2014/0303065 A1 Oct. 9, 2014

(30) Foreign Application Priority Data

Apr. 9, 2013 (DE) .......................... 10 2013 206 175

(51) Int. Cl.
| C08G 77/18 | (2006.01) |
| C08G 77/46 | (2006.01) |
| C08G 77/62 | (2006.01) |
| C11D 3/00 | (2006.01) |
| D06M 15/647 | (2006.01) |
| D06M 15/643 | (2006.01) |
| D06M 101/06 | (2006.01) |

(52) U.S. Cl.
CPC ................ *C08G 77/18* (2013.01); *C08G 77/46* (2013.01); *C11D 3/001* (2013.01); *D06M 15/647* (2013.01); *D06M 15/6436* (2013.01); *D06M 2101/06* (2013.01)

(58) Field of Classification Search
CPC ...... C11D 3/373; C11D 3/3742; C08G 77/18; C08G 77/46; C08G 77/62
See application file for complete search history.

(56) References Cited

U.S. PATENT DOCUMENTS

| 5,994,415 | A | 11/1999 | Gruning et al. |
| 7,361,777 | B2 | 4/2008 | Herrwerth et al. |
| 7,931,747 | B2 | 4/2011 | Weyershausen et al. |
| 8,076,440 | B2 | 12/2011 | Kuppert et al. |
| 8,084,633 | B2 | 12/2011 | Herrwerth et al. |
| 8,158,572 | B2 * | 4/2012 | Schubert et al. ............. 510/466 |
| 8,172,936 | B2 | 5/2012 | Herrwerth et al. |
| 8,247,525 | B2 | 8/2012 | Schubert et al. |
| 8,268,939 | B2 | 9/2012 | Ebbrecht et al. |
| 8,283,422 | B2 | 10/2012 | Schubert et al. |
| 8,309,664 | B2 | 11/2012 | Knott et al. |
| 8,309,673 | B2 | 11/2012 | Schubert et al. |
| 8,324,325 | B2 | 12/2012 | Knott et al. |
| 8,334,355 | B2 | 12/2012 | Henning et al. |
| 8,450,514 | B2 | 5/2013 | Schubert et al. |
| 8,557,944 | B2 | 10/2013 | Henning et al. |
| 8,729,207 | B2 | 5/2014 | Hartung et al. |
| 8,772,423 | B2 | 7/2014 | de Gans et al. |
| 8,779,079 | B2 | 7/2014 | Henning et al. |
| 8,796,198 | B2 | 8/2014 | Henning et al. |
| 8,802,744 | B2 | 8/2014 | Knott et al. |
| 8,957,009 | B2 * | 2/2015 | Schubert et al. ............. 510/466 |
| 2007/0212326 | A1 * | 9/2007 | Ochs et al. ................. 424/78.27 |
| 2007/0213226 | A1 | 9/2007 | Sieverding et al. |
| 2008/0213208 | A1 | 9/2008 | Moeller et al. |
| 2008/0251751 | A1 | 10/2008 | Bruckner et al. |
| 2009/0137752 | A1 | 5/2009 | Knott et al. |
| 2010/0071849 | A1 | 3/2010 | Knott et al. |
| 2010/0081781 | A1 | 4/2010 | Schubert et al. |
| 2010/0210445 | A1 | 8/2010 | von Rymon Lipinski et al. |
| 2010/0266518 | A1 | 10/2010 | Springer et al. |
| 2011/0042004 | A1 | 2/2011 | Schubert et al. |
| 2011/0046305 | A1 | 2/2011 | Schubert et al. |
| 2011/0190190 | A1 * | 8/2011 | Schubert et al. ............. 510/329 |
| 2011/0230619 | A1 | 9/2011 | Kuppert et al. |
| 2012/0028022 | A1 | 2/2012 | Brugger et al. |
| 2012/0029090 | A1 | 2/2012 | Brugger et al. |
| 2012/0067520 | A1 | 3/2012 | Schubert et al. |
| 2012/0068110 | A1 | 3/2012 | Schubert et al. |
| 2012/0190760 | A1 | 7/2012 | Henning et al. |
| 2012/0296125 | A1 | 11/2012 | Schubert et al. |
| 2012/0308494 | A1 | 12/2012 | Schubert et al. |
| 2012/0329955 | A1 | 12/2012 | Kuppert et al. |
| 2013/0035452 | A1 | 2/2013 | Kuppert et al. |
| 2013/0041115 | A1 | 2/2013 | Knott et al. |
| 2013/0213267 | A1 | 8/2013 | Fiedel et al. |
| 2013/0217930 | A1 | 8/2013 | Haensel et al. |
| 2013/0237616 | A1 | 9/2013 | Ferenz et al. |
| 2013/0245304 | A1 | 9/2013 | Schubert et al. |
| 2013/0267403 | A1 | 10/2013 | von Rymon Lipinski et al. |
| 2013/0345318 | A1 | 12/2013 | Schubert et al. |
| 2013/0345340 | A1 | 12/2013 | Scheuermann et al. |

FOREIGN PATENT DOCUMENTS

WO WO 2008/127519 10/2008

* cited by examiner

*Primary Examiner* — Brian P Mruk

(74) *Attorney, Agent, or Firm* — Frommer Lawrence & Haug LLP

(57) ABSTRACT

Polysiloxane polyether copolymers with amino groups and/or quaternary ammonium groups in the polyether moiety, process for their preparation from hydrogen siloxanes and chlorine-containing unsaturated polyethers in a hydrosilylation reaction with subsequent substitution of chlorine by amine groups and use as softeners for textile fabrics.

15 Claims, No Drawings

POLYSILOXANE-POLYETHER COPOLYMERS WITH AMINO GROUPS AND/OR QUATERNARY AMMONIUM GROUPS IN THE POLYETHER MOIETY AND PROCESSES FOR THE PREPARATION THEREOF

The present application claims priority from German Patent Application No. DE 10 2013 206 175.7 filed on Apr. 9, 2013, the disclosure of which is incorporated herein by reference in its entirety.

FIELD OF THE INVENTION

The invention relates to polysiloxane-polyether copolymers with amino groups and/or quaternary ammonium groups in the polyether moiety. It further relates to processes for their preparation from hydrogen siloxanes and chlorine-containing unsaturated polyethers in a hydrosilylation reaction with subsequent substitution of chlorine by amine groups, and the use of these polymers as softeners for fabrics, such as, for example, wovens, in particular textile wovens, tissue, nonwovens and/or fibres made of natural and/or synthetic raw materials and/or leather, hair or pelt, and to the use thereof in cosmetic applications, such as, for example, in hair care, skincare and body care.

Softeners for fabrics, such as, for example, wovens, textile wovens, knits, nonwovens and/or fibres made of natural and/or synthetic raw materials, are substances which impart a soft supple feel to the specified materials. In most cases, polysiloxanes with quaternary ammonium groups are used. By virtue of electrostatic forces of attraction, the ionic groups anchor the siloxane to the fibre. In this way, friction is reduced and the desired softener effect is achieved. If the siloxane is applied in the form of microemulsions, it can additionally penetrate into the fibre and imparts inner softness and fullness thereto.

There are specific preparations for the care of damaged hair, such as hair rinses, hair treatments, shampoos, leave-on conditioners, etc., which in particular improve the combability, the feel and the shine of damaged hair.

There is therefore a need for versatile active ingredients for textile care and body care.

Within the context of this invention, the term polyether includes both polyethers, polyetherols and also polyether alcohols, which are sometimes used synonymously with one another. Here, it is not necessary that the expression "poly" must be associated with there being a large number of ether functionalities or alcohol functionalities in the molecule or polymer. Rather, it merely indicates that at least repeat units of individual monomer building blocks are present, or else compositions which have a higher molecular mass and moreover also still a certain polydispersity.

In connection with this invention, the word fragment "poly" includes not only exclusively compounds with at least three repeat units of one or more monomers in the molecule, but in particular also those compositions of compounds which have a molecular weight distribution and at the same time have an average molecular weight of at least 200 g/mol. This definition takes into consideration the fact that it is customary in the technological field in question to already refer to such compounds as polymers even if they do not appear to satisfy a polymer definition analogously to the OECD or REACH Guidelines.

The term polysiloxane-polymer copolymer is used synonymously to polyethersiloxane and silicone polyether.

It is noted that citation or identification of any document in this application is not an admission that such document is available as prior art to the present invention.

Polysiloxanes with quaternary ammonium groups are known as additives for hair care. Thus, for example, DE 14 93 384, EP 0 017 122 and U.S. Pat. No. 4,895,964 describe structures in which siloxanes are laterally modified with ammonium groups distributed randomly over the polymer. These compounds have the disadvantage that they do not have marked silicone character, and good effectiveness as a textile softener is not observed.

A significantly more marked silicone character is shown, by contrast, by cationic silicones, as described in EP 0 294 642 (U.S. Pat. No. 4,891,166). EP 0 294 642 describes structures in which the quaternary functions are bonded terminally to a siloxane segment. If a textile is treated with compounds of this type, although it is given a good soft feel, the siloxane can be removed easily again from the corresponding textile owing to its low substantivity, for example by washing operations. In contrast to the domestic softener, it is, however, desirable for industrial textile end finishing that the siloxane remains on the textile even after washing and the soft feel is thus not lost.

Addressing the aspect of increased hydrophilicity, WO 1997/032917 (U.S. Pat. Nos. 5,807,956 and 5,981,681) claim nonhydrolysable block copolymers of the $(AB)_nA$ type with alternating units consisting of polysiloxane and amino functional polyether, and a route for the preparation thereof. Here, precious metal catalyzedhydrosilylation links alpha,omega-dihydrogenpolydimethylsiloxanes with olefins carrying epoxide groups via an SiC bond, and the epoxy-terminated siloxanes thus obtained are reacted with amino-terminated polyethers. An alternative approach is also the hydrosilylating linkage of alpha,omega-dihydrogenpolydimethylsiloxanes with epoxy-terminated allyl polyethers and the subsequent reaction of the epoxy-functionalized siloxanes thus obtained with diamines.

The teaching of WO 2002/092904 (U.S. Pat. No. 6,475,568 B1) relates to compositions consisting of nonhydrolysable, block-like copolymers which do not have an $(AB)_n$ structure and which are obtained by the reaction between polydimethylsiloxanes A having epoxide groups and polyethers B carrying epoxy termini in the presence of primary amines and/or mixtures consisting of primary and secondary amines.

The person skilled in the art is aware that the direct hydrosilylating linkage of hydrogen siloxanes with amine-functional polyethers having terminal C=C double bonds is difficult to impossible on account of the deactivation of the industrially available noble metal catalysts since amine groups block the active noble metal complex centre and thus lead to inhibition of the catalyst (DE 69 318 268 T2, U.S. Pat. No. 5,416,147).

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

The object of the present invention is to provide new types of polysiloxane-polyether copolymers which overcome at least some of the disadvantages of the prior art.

Surprisingly, it has been found that polysiloxane-polyether copolymers which carry amino groups and/or quaternary ammonium groups in their polyether moiety achieve this object.

SUMMARY OF THE INVENTION

The invention therefore provides polysiloxane-polyether copolymers with amino groups and/or quaternary ammonium groups in the polyether moiety, the amino groups and/or quaternary ammonium groups of which are bonded directly to a carbon of the polyalkoxylene chain via a methylene group.

they do not facilitate a better understanding of the present invention, a discussion of such elements is not provided herein.

The polysiloxane-polyether copolymers according to the invention which carry amino groups and/or quaternary ammonium groups in their polyether moiety have the advantage that these compounds optionally contain no double-bonds, and they preferably contain no methylidene groups.

It is an advantage of the process according to the invention that the substitution of the chlorine atoms by compounds containing amino groups proceeds without elimination to give unsaturated compounds.

A further advantage of the process according to the invention is the good synthetic accessability of a multitude of structures that can be determined in a targeted manner. Furthermore, the adjustability of the property profiles within wide limits is advantageous.

The polysiloxane-polyether copolymers according to the invention having amino groups and/or quaternary ammonium groups in the polyether moiety are compounds of general formula (1),

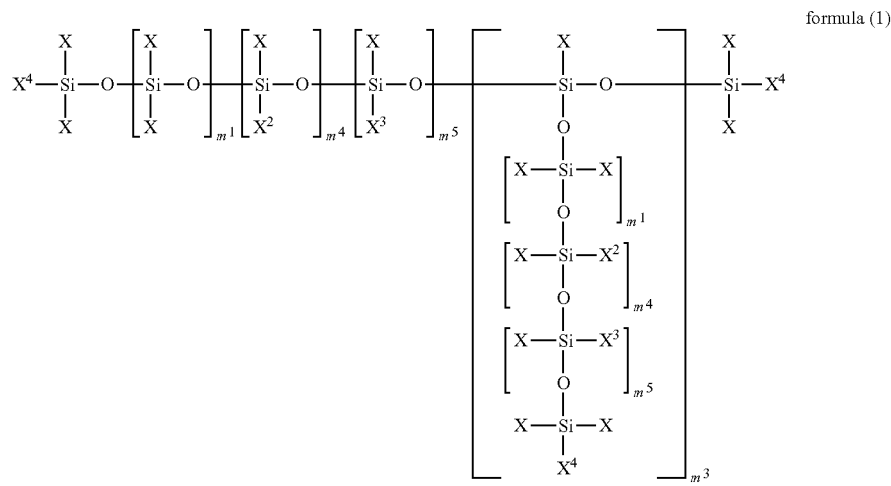

formula (1)

The invention further provides a process for the preparation of the polysiloxane-polyether copolymers according to the invention having amino groups and/or quaternary ammonium groups in the polyether moiety.

The invention likewise provides compositions comprising the polysiloxane-polyether copolymers according to the invention having amino groups and/or quaternary ammonium groups in the polyether moiety.

The invention further provides the use of the polysiloxane-polyether copolymers according to the invention having amino groups and/or quaternary ammonium groups in the polyether moiety, and also the compositions according to the invention for textile care and body care.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because where
  m1 is from 0 to 500, preferably from 10 to 200, in particular from 15 to 100,
  m3 is from 0 to 30, preferably from greater than 0 to 15, in particular from 1 to 5,
  m4 is from 0 to 60, preferably from greater than 0 to 30, in particular from 1 to 20,
  m5 is from 0 to 60, preferably from greater than 0 to 30, in particular from 1 to 20,
  with the proviso that the sum of the indices m1, m3, m4 and m5 is at least equal to 1,
  X independently of the each other is a linear, cyclic or branched, aliphatic or aromatic, saturated or unsaturated hydrocarbon radical having 1 to 20 carbon atoms which can optionally contain heteroatoms such as oxygen, nitrogen, phosphorus or sulphur, which is preferably a methyl group,
  X4 is alternatively X, X2 and/or X3,
  X2 is a polyether radical of the formula (1a)

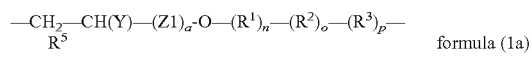

formula (1a)

where
  Y is either hydrogen or a monovalent organic radical having at least one carbon atom, the organic radical preferably being an alkyl group having 1 to 8 carbon atoms, particularly preferably a methyl group, with the radical Y preferably being hydrogen, Z1 is a divalent saturated or unsaturated organic radical, preferably a linear or branched alkylene group having 1 to 30 carbon atoms, particularly preferably a methylene, ethylene, propylene or butylene group, particularly preferably a methylene group, a is 0 or 1, preferably 1, n is 0 to 200, preferably greater than 0 to 150, particularly preferably 1 to 100, o is 1 to 1000, preferably greater than 1 to 800, more preferably 5 to 600, particularly preferably 8 to 500, more particularly preferably 10 to 400 and especially preferably 30 to 100, p is 0 to 200, preferably greater than 0 to 150, particularly preferably 1 to 100, with the proviso that the sum of the indices n+o+p is at least 3, $R^1$=—$CH_2CH_2O$—

$R^2$=—$CH_2CH(CH_3)O$— or —$CH(CH_3)CH_2O$—

$R^3$=—$CH_2CHRO$— or —$CHRCH_2O$—

R independently of the others is an alkyl group having 2-18 carbon atoms or an aromatic radical, in particular an ethyl group or butyl group or a phenyl radical, $R^5$ independently of the others is hydrogen, an alkyl group having 1-18 carbon atoms or a group $R_E$—C(=O)—, preferably a methyl group, $R_E$ independently of the others is an alkyl group having 1-17 carbon atoms or an aromatic radical, in particular a methyl group, an ethyl group, a propyl group or a phenyl radical, X3 is a polyether radical of the formula (1b)

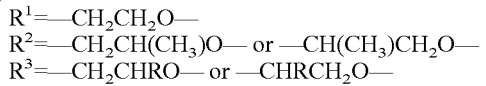

where q is 1 to 50, preferably greater than 1 to 30, in particular 2 to 20, $R^4$=—$CH_2CH(CH_2W)O$— or —$CH(CH_2W)CH_2O$— and a, n, o, p, $R^1$, $R^2$, $R^3$, $R^5$, Y, Z1 have the meanings defined above, where W is chlorine or a group having nitrogen, with the proviso that m5 is at least 1 when X4 is not the same as X3.

Preferably, W is a group which is bonded via a nitrogen.

More preferably, W satisfies formula (6)

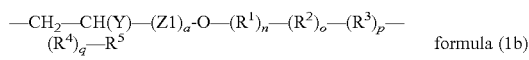

where $R^{N1}$ and $R^{N2}$, independently of one another, are hydrogen, a linear, cyclic or branched, aliphatic or aromatic, saturated or unsaturated hydrocarbon radical having 1 to 20 carbon atoms, which can optionally contain one or more heteroatoms, preferred hydrocarbons are linear alkyl radicals having 1 to 20, preferably 2 to 8 and particularly preferably having 3 to 5 carbon atoms, where the alkyl radicals can be interrupted by heteroatoms, where the heteroatoms are preferably selected from the group oxygen, nitrogen, phosphorus and sulphur, preferably from oxygen and nitrogen, the heteroatoms being in particular nitrogen.

Preferred radicals $R^{N1}$ and $R^{N2}$ are hydrocarbon radicals which contain 1, 2, 3, 4, 5, 6, 7, 8, 9 or 10 primary, secondary and/or tertiary amine groups, preferably 1 to 5 and especially preferably 1 to 3 amino groups. Particularly preferred hydrocarbon radicals are, for example, methyl, ethyl, propyl, butyl, pentyl, hexyl, 2-ethylhexyl, histamino, 2-phenylethyl, 2-aminoethyl, 3-aminopropyl, 4-aminobutyl, 5-aminopentyl, 6-aminohexyl, 2-(2-aminoethyl)aminoethyl (corresponding to the radical from diethylenetriamine), 2-(2-(2-aminoethyl) aminoethyl)aminoethyl (corresponding to the radical from triethylenetetramine), 3-(3-(dimethylamino)propyl)aminopropyl, 5-diamino-2-methylpentyl, 3-(3-(dimethylamino) hexyl)aminohexyl, 3-(dimethyl-amino)propyl, N,N-dimethylethyl, hydroxyethyl, 2-hydroxypropyl, bis(3-dimethylamino)propyl radicals.

Further preferred linear hydrocarbon radicals are alkylene radicals having 2 to 8 carbon atoms which are substituted in the terminal position with heteroatoms such as nitrogen or oxygen, where the alkylene radicals are preferably ethylene, propylene, butylene, pentylene, hexylene, heptylene or octylene radicals, especially preferably propylene, where the heteroatoms can be substituted with alkyl radicals having 1 to 4 carbon atoms, are preferably substituted with methyl radicals, are substituted with two methyl groups especially in the case of nitrogen.

More preferred cyclic hydrocarbons are substituted or unsubstituted systems having cyclopentyl or cyclohexyl groups, particularly preferably 2-aminocyclohexyl, especially preferably the radicals of isophoronediamine.

The radicals $R^{N1}$ and $R^{N2}$, together with the nitrogen to which they are bonded, can form a mono-, bi- or tricyclic aliphatic ring system having 3 to 10 ring members, where the atoms forming ring members are selected from the group carbon, nitrogen and oxygen, preferred ring systems are mono- or bicyclic aliphatic ring systems, more preferred ring systems are pyridinyl, piperidyl, piperazinyl, morpholinyl, imidazole.

Preferably, the polyether radical according to formula (1a) and/or according to formula (1b) has more oxypropylene units than oxyethylene units.

Furthermore, the polyether radical of formula (1a) preferably has no terminal chloromethyl groups. In particular, preference is given to the embodiment according to the invention according to which the polyether radical according to formula (1a) has a hydroxypropyl group in the terminal position.

Furthermore, the polyether radical of formula (1b) preferably has no terminal radicals $R^4$. Particularly preferably, the polyether radical of formula (1b) has a hydroxypropyl group in the terminal position.

All polyether radicals particularly preferably have a hydroxypropyl group in the terminal position.

Preferably, the polysiloxane-polyether copolymers according to the invention with amino groups and/or quaternary ammonium groups in the polyether moiety according to formula (1) have no halogen atoms, in particular no chlorine atoms.

Preferably, the compounds of formula (1) according to the invention have no double bonds; they particularly preferably have no methylidene groups.

Particular preference is given to compounds of formula (1), (1a) and (1b) in which m1 is 15 to 100, m3 is 1 to 3, m4 is 0, m5 is 2 to 4, a is 1, n is 0 to 20, o is 15 to 80, p is 0 to 5, q is 1 to 10, y is hydrogen, Z1 is methylene, $R^5$ is hydrogen, W is 3-(3-dimethylamino)propylamino, 2-(2-aminoethyl)aminoethylamino or n-hexylamine and the unexplained indices and radicals have the meanings defined above.

The index numbers m1, m2, m3, m4, m5, a, n, o, p, q given in formulae (1), (1a), (1b), (2), (3), (4), (5), (6) and (6a), and the value ranges of the stated indices are understood to be average values of the possible statistical distribution of the structures actually present and/or mixtures thereof, where the distributions of formula (5) and of index a arise through using material mixtures as starters for the preparation of the polyethers of formulae (3) and (4). The same is true for formula (6)

if mixtures of amines are used. This is also the case for structural formulae reproduced exactly as such per se.

The demonstrations of the freedom from halogen according to the invention and the absence of methylidene groups are familiar to the person skilled in the art. In the context of the present invention, halogen-free and free from methylidene groups is understood as meaning that the corresponding resonance signals in the $^{13}$C-NMR spectra cannot be detected. The position and multiplicity of the signals is known to the person skilled in the art, and the signals of the methylidene groups in particular can be assigned reliably in $^{13}$C-NMR.

The polysiloxane-polyether copolymers according to the invention with amino groups and/or quaternary ammonium groups in the polyether moiety are in principle obtainable by the processes in the prior art, and they are preferably prepared using the processes described below.

The process according to the invention has at least a step (i) in which at least one chloromethyl group-containing terminally unsaturated polyether is hydrosilylated, a step (ii) in which the chlorine atoms are substituted by amino groups of a radical having nitrogen and optionally a step (iii) in which at least one nitrogen atom is converted to a quaternary ammonium group.

Furthermore, solvents can optionally be used in the process according to the invention, optionally salts (chlorides) can be removed from the end product e.g. by filtration or phase separation, and/or optionally monomeric, free amines can be removed e.g. by distillation.

a) Hydrosilylation

In step (i) of the process according to the invention, one or more hydrogen siloxanes with at least one SiH function per molecule are reacted with at least one terminally unsaturated chlorine-containing polyether in the presence of a catalyst suitable for the hydrosilylation with SiC linkage.

Preferably, in the process according to the invention, in step (i), a polyether of formula (3)

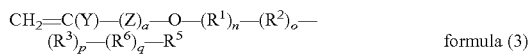

formula (3)

whereby
a, n, o, p, q, $R^1$, $R^2$, $R^3$, $R^5$, Y have the meanings defined above,
Z is a divalent saturated or unsaturated organic radical,
$R^6$=—CH$_2$CH(CH$_2$Cl)O— or —CH(CH$_2$Cl)CH$_2$O—
with the proviso that the sum of the indices n+o+p+q is at least equal to 3;
is reacted with at least one hydrogen siloxane of formula (2)

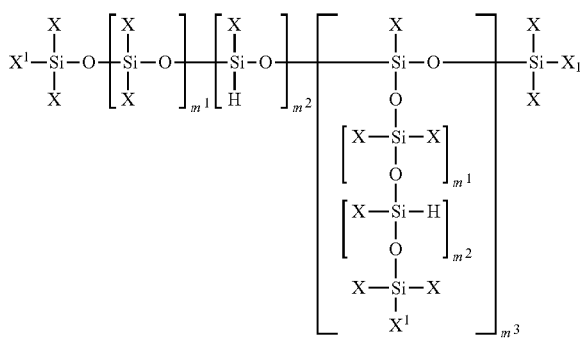

formula (2)

where
m1, m3 and X have the meanings defined above
X1 is alternatively X or H,
m2 is an integer from 0 to 60, preferably greater than 0 to 40, particularly from 1 to 20,
with the proviso that m2 is at least 1 when X1 is not the same as H,
using a catalyst which favours the hydrosilylation.

The polyethers of formula (3) are characterized by weight-average molar masses of greater than 200 up to 15 000 g/mol, preferably from 500 up to 10 000 g/mol, further preferably from 750 up to 8000 g/mol.

Preference is given to polyethers of formulae (3) which, besides epichlorohydrin, are composed of the alkylene oxides ethylene oxide, propylene oxide, butylene oxide or styrene oxide and are prepared starting from allyl alcohol as chain starter. The polyethers of formula (3) are particularly preferably characterized by the copolymerization of epichlorohydrin with propylene oxide and/or ethylene oxide.

A characterizing feature of all of the polyethers of formula (3) is the structural element [—CH$_2$—CH(CH$_2$Cl)—O] or [—CH(CH$_2$Cl)—CH$_2$—O—] in the polymer chain.

Preferably, the process according to the invention is carried out such that the polyethers of formula (3) do not have terminal chloromethyl groups. In particular, preference is given to the embodiment according to the invention according to which propylene oxide is added as the last metered addition in the DMC catalyzed ring-opening polymerization.

The chlorine atom containing polyethers of formula (3) can be reacted in combination with further compounds that have hydrogen siloxanes of formula (2) and are capable of hydrosilylation. These are chlorine-free polyethers of formula (4)

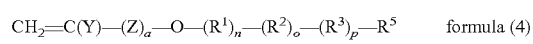

formula (4)

where
a, n, o, p, $R^1$, $R^2$, $R^3$, $R^5$, Y, Z have the meanings defined above.

The molar ratio of the polyethers according to formulae (3) and (4) is variable. It is preferred to use a molar excess of chlorine atom containing polyethers in order to obtain the polysiloxane polyether copolymers according to the invention having at least one amino function or quaternary ammonium function according to formula (1).

Polyethers of formulae (3) and (4) can be prepared using the alkoxylation methods known to the person skilled in the art, e.g. acid or DMC-catalyzed alkoxylation methods, preferably in a DMC catalyzed reaction.

The catalysts used for preparing polyethers are double metal cyanide (DMC) catalysts. The DMC-catalyzed alkoxylation proceeds very selectively and quickly and permits the preparation of polyethers with high molar masses and comparatively low polydispersity. The preparation and use of double metal cyanide complexes as alkoxylation catalysts is described in U.S. Pat. Nos. 5,470,813 and 5,482,908, among which the zinc-cobalt hexacyano complexes have proven to be the most effective types of DMC catalysts. Thanks to their extraordinarily high activity, only small catalyst concentrations are required for preparing polyethers.

Preference is given to using a double metal cyanide catalyst of the empirical formula Zn$_3$[Co(CN)$_6$]$_2$, particular preference being given to catalysts as described in EP0755716 (U.S. Pat. Nos. 5,780,584 and 5,627,122).

Furthermore, the DMC catalyst is preferably used in an amount of greater than 0 to 2000 wppm (mass-ppm), preferably from 30 wppm to 1800 wppm, based on the mass of the total polyether.

The polyethers of formulae (3) and (4) preferably used within the context of the invention are alkoxylation products of epichlorohydrin, prepared using DMC catalysts. Products of this type are known from U.S. Pat. No. 7,423,112.

The starters used for the preparation of the polyethers of formulae (3) and (4) are unsaturated hydroxyl compounds of formula (5)

$$CH_2=CH(Y)-(Z)_a-OH \qquad \text{formula (5)}$$

where the radicals Z and Y, and the index a are as defined above.

Preference is given to terminally unsaturated alcohols such as e.g. allyl alcohol, methallyl alcohol, hex-5-en-1-ole, vinyloxybutanol, trimethylolpropane monoallyl ether, glycerol monoallyl ether and pentaerythritol monoallyl ether, eugenol, allylphenol, allyloxyethanol, particular preference being given to the starters allyl alcohol and methallyl alcohol.

Preferred alkylene oxides are ethylene oxide, 1,2-epoxypropane (propylene oxide), epichlorohydrin, 2,3-epoxy-1-propanol, 1,2-butylene oxide, 2,3-epoxybutane, 1,2-epoxypentane, 1,2-epoxyhexane, 1,2-epoxyoctane, 1,2-epoxydecane, 1,2-epoxydodecane, styrene oxide, 1,2-epoxycyclopentane, 1,2-epoxycyclohexane, (2,3-epoxypropyl)benzene, 2-vinyloxirane, 1,2-epoxy-3-phenoxypropane, 2-methoxymethyloxirane, 2,3-epoxypropyl isopropyl ether, (3,4-epoxybutyl) stearate, 2,3-epoxylpropane methacrylate, epifluorohydrin, epibromohydrin, epiiodohydrin, particular preference being given to ethylene oxide, propylene oxide, 1,2-butylene oxide, epichlorohydrin and styrene oxide.

Catalysts which can be used for the hydrosilylation are metal catalysts, preferably precious metal catalysts of the platinum group, more preferably platinum-, rhodium-, iridium- or ruthenium-containing catalysts, in particular complexes which are known to the person skilled in the art as hydrosilylation-active catalysts, e.g. platinum compounds such as, for example, hexachloroplatic acid, $(NH_3)_2PtCl_2$, cis-platinum, bis(cyclooctene)platinum dichloride, carboplatinum, platinum(0) (divinyltetramethyldisiloxane) complexes, so-called Karstedt catalysts, and also platinum(0) complexes complexed with various olefins. Furthermore, rhodium and ruthenium compounds, such as, for example, tris(triphenylphosphine) rhodium(I) chloride or tris(triphenylphosphine) ruthenium(II) dichloride are suitable. Catalysts that are preferred in the context of the process according to the invention are platinum(0) complexes. Particular preference is given to Karstedt catalysts or so-called WK catalysts which can be prepared in accordance with EP 1520870 (U.S. Pat. No. 7,157,541). Particular preference is given to platinum(0) divinyltetramethyldisiloxane complexes.

Suitable and preferred conditions for the hydrosilylation reaction are described e.g. in EP 1520870 (application Examples 1, 4-7); this is hereby incorporated by reference and forms part of the disclosure content of the present invention.

The person skilled in the art is aware that the catalyst has to be selected such that it is not inhibited or inactivated by the individual components used in the reaction, preference being given to catalysts/reactant end mixtures which do not influence the properties, nor the reactivity of the catalyst.

The hydrosilylation catalysts are preferably used in an amount of from 0.1 to 1000 wppm, more preferably 1 to 100 wppm, particularly preferably more than 1 up to 50 wppm and especially preferably 2 to 30 wppm, based on the mass of the total mixture of the hydrosilylation reaction.

The hydrosilylation reaction can be carried out in a one-pot process or in a metered process, in one or multi-stage process. To compatibilize the reactants and also to simplify the handling of highly viscous to solid reactants, the reaction can be carried out in solvents such as, for example, toluene or xylene. The reaction can likewise be carried out solvent-free in the form of an emulsion polymerization. On an industrial scale, the hydrosilylation can be performed either in a stirred-tank reactor as a classic batch process, or else in a continuous process, as described for example in EP 1013701 (U.S. Pat. No. 6,291,622).

The hydrosilylation catalysts can be metered into the reaction mixture or into one of the reactants in the form of a solid or in dissolved form.

Preferably, the hydrosilylation catalysts are metered in dissolved form in a liquid siloxane. Preferred liquid siloxanes are cyclic siloxanes with 3 to 8 siloxane units, particular preference being given to decamethylcyclopentasiloxane. The catalyst solutions can also contain mixtures of different siloxanes, particular preference being given to mixtures which comprise decamethylcyclopentasiloxane.

Furthermore, preference is given to using the hydrosilylation catalysts in dilute solution. Preferred concentrations of catalyst are between 0.01 and 1% by weight of platinum, more preferably between 0.05 and 0.75% by weight of Pt and in particular between 0.15 and 0.5% by weight of Pt, based on the platinum fraction of the catalysts in the catalyst solution.

Particular preference is given to solutions of platinum(0) divinyltetramethyldisiloxane complexes in decamethylcyclopentasiloxane with a catalyst content of from 0.09 to 0.12% by weight of platinum, based on the platinum fraction of the catalysts in the catalyst solution.

The hydrosilylation can be carried out at temperatures in the range from 20 to 200° C., preferably at 40 to 150° C. and particularly preferably at 60 to 120° C. The reaction conversion can take place by means of gas-volumetric determination of the siloxane bonded hydrogen. Here, a sample of the reaction mixture is decomposed in alkaline solution, and the hydrogen released as a result is measured on a gas burette.

It may be advantageous to carry out the process according to the invention in such a way that the C=C double bonds of the polyether are brought to reaction with the SiH groups of the siloxane component in virtually quantitative amounts. Also advantageous are embodiments in which the compounds of formula (1) according to the invention no longer contain free SiH groups.

The compounds according to the invention obtained by the hydrosilylation can be transparent or milky-cloudy depending on the starting materials used. The viscosities at room temperature are in the range from 1 to 100 000 mPa*s, preferably from greater than 1 to 50 000 mPa*s and especially preferably from 2 to 20 000 mPa*s. The viscosities can be determined by means of a spindle viscosimeter of the Brookfield LV-DV-I+ type at 25° C. These measurements can be carried out in accordance with DIN 53019.

The molar ratio of the SiH groups in the hydrogen siloxane of formula (2) to the sum of the C=C double bonds of polyethers (3) and (4) in the hydrosilylation reaction is variable within wide limits. Preference is given to a molar ratio of double bond to SiH of greater than 0.8 to 1.0, particularly preferably greater than 1.0 to 1.0 to 1.5 to 1.0. In the event of an excess of double bonds based on SiH, excess polyethers remain in the hydrosilylation product. The excess polyethers can be present unchanged or be structurally modified as a result of secondary reactions and also as a result of subsequent reactions. The excess polyethers can be formed in particular as a result of possible allyl-propenyl rearrangements. The excess polyethers thus become part of the reaction products.

b) Reaction with Amines

In step (ii) of the process according to the invention, the products of step (i) are reacted with at least one amine compound of formula (6a)

 formula (6a)

with substitution of at least one chlorine atom, where, as regards $R^{N1}$ and $R^{N2}$, the meanings given with respect to formula (6) are applicable.

The polysiloxane polyether copolymers resulting from the hydrosilylation and having a chlorine-containing polyether moiety (products of step (i)) are reacted, with Cl substitution, with one or more nitrogen containing compounds to give the products of formula (1) according to the invention.

Preferably, all chlorine atoms are replaced by substitution with amino groups. Complete conversion is preferably demonstrated by $^{13}$C-NMR spectroscopy.

An advantage of the process according to the invention according to step (ii) is that the substitution proceeds without elimination to give unsaturated compounds.

It is possible to use all amine compounds with primary, secondary or tertiary amine groups and molar masses of 17 g/mol (ammonia) to 1000 g/mol, preferably 31 g/mol to 600 g/mol, particularly preferably from 31 g/mol to 300 g/mol. Here, the amine compounds can contain 1, 2, 3, 4, 5, 6, 7, 8, 9 or 10 primary, secondary and/or tertiary amine groups, preferably 1 to 5 and particularly preferably 1 to 3 amino groups. Amine compounds that are suitable in the context of the invention are, for example, ammonia, methylamine, ethylamine, propylamine, butylamine, pentylamine, hexylamine, 2-ethylhexylamine, histamine, 2-phenylethylamine, dimethylamine, diethylamine, dipropylamine, dibutylamine, dipentylamine, dihexylamine, ethylenediamine, propylenediamine, butylenediamine, pentylenediamine, hexylenediamine, diethylenetriamine, dipropylenediamine, 1,5,10-triazodecane, triethylenetetramine, 1,2-diaminocyclohexane, 4,4'-diaminodiphenylsulphone, 1,5-diamino-2-methylpentane, isophoronediamine, 3-(dimethylamino)propylamine, N,N-dimethylethylenediamine, 1-methylimidazole, ethanolamine, 1-aminopropan-2-ole, dopamine, thioethanolamine, bis(3-dimethylamino)propylamine, pyrrolidine. Ring systems are piperidine, piperazine, morpholine, azepane, and imidazole.

The reaction between amine compounds and chlorine-containing siloxane-polyether copolymer takes place between 40 and 200° C., particularly preferably in the temperature range between 70° C. and 140° C. It requires a reaction time of one hour to 12 hours, particularly preferably from 2 hours to 6 hours. The amount of amino groups in the reaction mixture, based on the chlorine content in the copolymer, is 0.5 to 5 equivalents of amino group per one equivalent of chlorine group in the chlorine-containing siloxane-polyether copolymer, particularly preferably 1.0 to 4 equivalents of amino groups, especially preferably 1.5 to 3 equivalents. The salts formed in the course of the reaction can be removed from the product by means of filtration and/or by means of extraction. Suitable extractants are e.g. water or aqueous solutions e.g. of acids or bases. Optionally, the excess amine compound is distilled off.

Amine-functionalized polyether siloxane copolymers prepared by this process contain at least one amino group. They have a weight-average molecular weight in the range from at least 500 g/mol to 100 000 g/mol, preferably from 2000 to 75 000 g/mol and particularly preferably from 5000 to 50 000 g/mol.

c) Quaternization

The inventive process optionally has a further step (iii) in which the product from step (ii) is further reacted, with formation of at least one ammonium group, where the reaction leads to the formation of quaternary compounds.

In the context of the present invention, quaternization is to be understood as meaning not only the reaction of amino group containing polysiloxane polyether copolymers of formula (1) with alkylating agents, but also the reaction with acids.

The person skilled in the art is aware that the protonation of amino compounds such as those of formula (1) is dependent on the pKa value and any solvents present; in principle, Brönstedt acids are suitable for the protonation.

Preferred acids can be mineral acids such as e.g.: hydrofluoric acid, hydrochloric acid, hydrobromic acid, nitric acid, sulphuric acid, phosphoric acid or amidosulphonic acid and organic acids such as e.g. trifluoroacetic acid, acetic acid and p-toluenesulphonic acid, more preferably organic acids, in particular acetic acid. Particularly preferred acids are halogen-free.

Alkylating agents which can be used are alkyl, aryl or aralkyl halides such as e.g. methyl chloride, methyl bromide, methyl iodide, ethyl bromide or ethyl iodide, benzyl halides, such as benzyl chloride or benzyl bromide; dialkyl, aryl or aralkyl sulphates such as e.g. dimethyl sulphate or diethyl sulphate, or oxonium salts such as e.g. trimethyloxonium chloride, trimethyloxonium bromide, trimethyloxonium tetrafluoroborate, triethyloxonium chloride, triethyloxonium bromide or triethyloxonium tetrafluoroborate, preference being given to dialkyl sulphates, particularly preferably dimethyl sulphate. Particularly preferred alkylating agents are halogen free.

The person skilled in the art is aware that the quaternized polysiloxane-polyether copolymers contain the corresponding anions of the alkylating agents used or the acids used in stoichiometric ratios.

It can be advantageous if the anions are at least partially exchanged with the help of an ion exchanger. The exchanged anions result from the prior loading of the ion exchanger in a manner known to the person skilled in the art. The exchange of halogen containing anions or halides for anions which contain no halogen atoms is particularly advantageous.

Along with the quaternization, the copolymer, compared to the unmodified aminic, gains in substantivity on textile or fibrous substrates and also in influence on its tendency towards electrostatic charging.

The process according to the invention makes it easy to build up copolymer structures. The hydrophobic siloxane character can be adjusted almost as desired through the siloxane chain length, and the hydrophilic character and the amine content can be adjusted almost as desired through the choice of polyether and the amine functionality. The distance of the nitrogen functions which enter into electrostatic interaction with the surface of the substrate can thus be optimally determined.

The process according to the invention is characterized as advantageous since it offers the flexibility of adjusting, in a targeted manner, the affinity of the products for the textile and/or fibrous carrier and ultimately the substantivity on the same through targeted selection of the structure of the hydrophobic polysiloxane backbone, the hydrophilic polyether moiety and by the amine functionality.

It is known to the person skilled in the art that the products of the process according to the invention are present in the form of a mixture with a distribution of the specified indices that is controlled essentially by laws of statistics.

In the context of the overall invention, statistical distributions can be built up blockwise with any desired number of blocks and any desired sequence or be subject to a randomized distribution; they can also have an alternating structure or else form a gradient chain, in particular they can also form all mixed forms in which groups of different distributions can possibly follow one another. Specific configurations can lead to these statistical distributions experiencing limitations due to the configuration. For all areas which are not affected by the limitation, the statistical distribution does not change.

Wherever molecules or fragments of molecules have one or more stereocentres or can be differentiated into isomers on the basis of symmetries or can be differentiated into isomers on the basis of other effects e.g. restricted rotation, all possible isomers are co-encompassed by the present invention. Isomers are known to the person skilled in the art, reference being made in particular to the definitions by Prof. Kazmaier at Saarland University, e.g. http://www.uni-saarland.de/fak8/kazmaier/PDF_files/vorlesungen/Stereochemie %2Strassb%20Vorlage.pdf. In particular, all possibilities arising from the stereochemical definitions of tacticity are encompassed, e.g. isotactic, syndiotactic, heterotactic, hemiisotactic, atactic. In the context of the invention, preference is given to polyethers and polyether fragments with an at least partial atactic substituent sequence.

The present invention likewise provides compositions comprising the products of the process according to the invention.

Besides the polysiloxane polyether copolymers according to the invention with amino groups and/or quaternary ammonium groups in the polyether moiety of formula (1) or the process products according to the invention, compositions according to the invention furthermore comprise additives and auxiliaries which can be selected from the list comprising emulsifiers, water, solvents, perfume, perfume carriers, dyes, viscosity regulators, antifoams, preservatives, antimicrobial active ingredients, germicides, fungicides, antioxidants, organic solvents, non-siloxane containing polymers and other non-inventive siloxane containing polymers such as e.g. silicone oils, surfactants, builders, bleaches, bleach activators, enzymes, fluorescent agents, foam inhibitors, antiredeposition agents, optical brighteners, greying inhibitors, shrink preventers, crease protectors, colour transfer inhibitors, corrosion inhibitors, antistats, bittering agents, ironing aids, phobization agents and impregnation agents, swelling and non-slip agents, neutral filling salts, and UV absorbers. In this connection, substances from one class can also manifest effectiveness in another class.

Preferred compositions according to the invention are in particular concentrates, compounds/emulsion concentrates and/or their aqueous formulations, aqueous emulsions and/or solutions, a formulation or emulsion in organic compounds such as polyethers, polyols, alcohols.

Particularly preferred compositions according to the invention are fabric softeners. These are aqueous formulations which, besides the compounds according to the invention of formula (1) and/or the process products according to the invention, comprise further additives and auxiliaries. Preferred additives and auxiliaries are perfume, dyes, viscosity regulators, antifoams, preservatives, organic solvents, non-siloxane containing polymers and other non-inventive siloxane containing polymers. In particular, the compositions according to the invention can comprise between 0.001 and 25% by weight, particularly preferably 0.01 to 15% by weight, based on the total mass of the fabric softener, of one or more different additives or auxiliaries.

Furthermore particularly preferred compositions according to the invention are concentrates which comprise the compounds of formula (1) according to the invention or the process products according to the invention in concentrations of about 90 to 99.99% by weight, based on the total concentrate mass, which are admixed only with small fractions of solvents. Preferably, the concentrates are not aqueous solutions.

Further particularly preferred compositions according to the invention are compound or emulsion concentrates which comprise the compounds of formula (1) according to the invention and/or the process products according to the invention in concentrations of 50-90% by weight, preferably 50-80% by weight, based on the total mass. Further constituents of these compositions are water and/or solvents selected from the group of glycols, unbranched and/or branched alcohols and/or alkyl ethers having 1 to 6 carbon atoms and optionally one or more non-ionic emulsifiers, for example an alcohol ethoxylate with 3-25 ethylene oxide units. Compounds and emulsion concentrates are generally water-soluble and/or self-emulsifying.

Particularly preferred compositions according to the invention are fabric softeners for the temporary or permanent finishing of textiles.

Textiles as understood in the context of this invention are fabrics selected for example from the group comprising wovens, textile wovens, knits, nonwovens, tissue (paper fibre) and/or fibres made of natural and/or synthetic raw materials and/or leather and/or hair and/or pelt.

The compositions according to the invention can optionally comprise further textile softeners. These are one or more cationic textile-softening compounds which contain one or more long-chain alkyl groups in a molecule. Widespread cationic textile-softening compounds include, for example, methyl-N-(2-hydroxyethyl)-N,N-di(tallowacyloxyethyl)ammonium compounds or N,N-dimethyl-N,N-di(tallowacyloxyethyl)ammonium compounds. Further suitable ammonium compounds are disclosed in US 2010/0184634 in paragraphs [0027] to [0068], the explicit disclosure content of which in this regard forms part of this disclosure by virtue of this reference.

The compositions according to the invention can be used e.g. as softeners for textiles and fabric in the form of concentrates, compound/emulsion concentrates and formulations, where the compounds of formula (1) according to the invention or the process products according to the invention are used in such systems proportionately to 0.5 to 99% by weight, preferably to 3 to 70% by weight, in particular to 5 to 50% by weight, based on the total formulation.

As a result of dilution with water it is possible to prepare e.g. the fabric softeners according to the invention from the concentrates, compound/emulsion concentrates and formulations according to the invention.

The term "liquor" stands for a mostly aqueous liquid in which textiles are washed, bleached, dyed or impregnated. A liquor according to the invention comprises the compounds of formula (1) according to the invention and/or the process products according to the invention. In this connection, the term "liquor" means the totality of solvent (in most cases water) and all of the constituents contained (dissolved, emulsified or dispersed) therein, such as, for example, dyes, emulsifiers and further auxiliaries. The totality of the constituents dissolved in the liquor is commonly also referred to as solids content, where the solids content indicates the residue on drying after evaporation of the volatile constituents (at about 100° C. to 105° C.). The amount of components in a liquor is usually given in g/l in the case of liquids or % (based on the ware weight).

In the textile sector, a treatment liquor is generally referred to as the bath (usually aqueous) in which (or with which) the fabric is finished with one or more (surface-active) substances. In this connection, besides the main systems of application, there are further forms of application, such as spraying, blade coating or roll coating, depending on the end use and therefore viscosity of the product.

Primarily two systems are used for aqueous systems:

Exhaustion in the case of substantive, i.e. cationic, products, where in principle, like the fabric softener in the washing machine, the fabric is agitated in the liquor at a specified temperature for a specified time. Subsequently, the liquor is discharged and the fabric is dried.

Padding in the case of nonsubstantive and substantive products, such as, for example, using a laboratory padder from Mat this (model HVF), the fabric here being led through the liquor and squeezed off between the rolls (mangle principle) to a residual moisture content and subsequently dried.

The emulsifiers used are typically fatty alcohol ethoxylates with degrees of ethoxylation between 3 and 12, and in a ratio of copolymer to fatty alcohol ethoxylate of 5:1 to 1:1. High-boiling glycols such as dipropylene glycol or butyl diglycol are likewise used.

As perfume, it is possible to use all fragrances or fragrance mixtures known to be suitable for aqueous fabric softeners from the prior art, preferably in the form of a perfume oil. Examples of fragrances or odorants are disclosed inter alia in DE 197 51 151 A1, page 4, lines 11-17. In particular, the compositions according to the invention can comprise between 0.01 and 10, particularly preferably 0.1 to 5% by weight, of one or more fragrances or fragrance mixtures.

Dyes which can be used are all of the dyes known to be suitable for aqueous fabric softeners from the prior art, with preference being given to water soluble dyes. Examples of suitable water soluble standard commercial dyes are SANDOLAN® Walkblau NBL 150 (manufacturer Clariant) and Sicovit® Azorubin 85 E122 (manufacturer BASF). In particular, the compositions according to the invention can comprise between 0.001 and 0.1% by weight, particularly preferably 0.002 to 0.05% by weight, of one or more dyes or dye mixtures.

As viscosity regulator for reducing the viscosity, the aqueous fabric softener can comprise an alkali metal salt or alkaline earth metal salt, preferably calcium chloride, in an amount of 0.05 to 2% by weight.

As viscosity regulator for increasing the viscosity, the aqueous fabric softener can comprise a thickener known to be suitable from the prior art, preference being given to the polyurethane thickeners known from WO 2007/125005. Examples of suitable thickeners are TEGO® Visco Plus 3030 (manufacturer Evonik Tego Chemie), Acusol® 880 and 882 (manufacturer Rohm & Haas), Rheovis® CDE (manufacturer BASF), Rohagit® KF 720 F (manufacturer Evonik Rohm GmbH) and Polygel® K100 from Neochem GmbH.

Antifoams which can be used are all antifoams known to be suitable for aqueous fabric softeners from the prior art. Examples of suitable standard commercial antifoams are Dow Corning® DB-110A and TEGO® Antifoam® 7001 XP. The compositions according to the invention preferably comprise between 0.0001 and 0.05, particularly preferably 0.001 to 0.01% by weight, of one or more different antifoams.

As preservative, the aqueous fabric softener can comprise bacteriocidal and/or fungicidal active ingredients known to be suitable from the prior art, preference being given to water-soluble active ingredients. Examples of suitable standard commercial bactericides are methylparaben, 2-bromo-2-nitro-1,3-propanediol, 2-methyl-4-isothiazolin-3-one and 5-chloro-2-methyl-4-isothiazolin-3-one. The aqueous fabric softener can likewise comprise an oxidation inhibitor as preservative. Examples of suitable standard commercial oxidation inhibitors are ascorbic acid, 2,6-di-tert-butyl-4-methylphenol (BHT), butylhydroxyanisole (BHA), tocopherol and propylgallate. Preferably, the compositions according to the invention comprise between 0.0001 and 0.5, particularly preferably 0.001 to 0.2% by weight, of one or more different preservatives. In particular, the compositions according to the invention can comprise between 0.001 and 0.1, particularly preferably 0.001 to 0.01% by weight, of one or more different oxidation inhibitors.

As organic solvents, the fabric softener can comprise short-chain alcohols, glycols and glycol monoethers, preference being given to ethanol, 2-propanol, 1,2-propanediol and dipropylene glycol. In particular, the compositions according to the invention can comprise between 0.1 and 10, particularly preferably 0.2 to 5% by weight, of one or more different organic solvents.

The fabric softener can comprise one or more non-siloxane containing polymers. Examples thereof are carboxymethylcellulose, polyethylene glycol, polyvinyl alcohol, poly(meth)acrylates, polyethyleneimines or polysaccharides. In particular, the compositions according to the invention can comprise between 0.01 and 25, particularly preferably 0.1 to 10% by weight, of one or more different non-siloxane containing polymers.

Further particularly preferred compositions according to the invention are detergents or cleaners.

One advantage of these detergents or cleaners is that they also have a textile-care effect as well as the washing or cleaning property ("2 in1" detergents or cleaners). The user does not require two compositions (detergent or cleaner and fabric softener) for this combination. Furthermore, a separate rinse cycle for the softening is not required.

The detergents or cleaners according to the invention can comprise further ingredients which further improve the application and/or aesthetic properties of the detergent or cleaner. These further ingredients can be selected from the group of surfactants, builders, bleaches, bleach activators, enzymes, perfumes, perfume carriers, fluorescence agents, dyes, foam inhibitors, silicone oils, antiredeposition agents, optical brighteners, greying inhibitors, shrink preventers, crease protectors, colour transfer inhibitors, antimicrobial active ingredients, germicides, fungicides, antioxidants, preservatives, corrosion inhibitors, antistats, bittering agents, ironing aids, phobization and impregnation agents, swelling and nonslip agents, neutral filling salts, and UV absorbers. In particular, the compositions according to the invention can comprise between 0.001 and 90, particularly preferably 0.01 to 45% by weight, based on the total mass of the detergents or cleaners, of one or more of the further ingredients specified here.

Examples of surfactants which can be used are described in WO 2007/115872 (US 2006042766), page 17, line 28 to page 21, line 24. Examples of builders, bleaches, bleach activators, bleach catalysts and enzymes are described in WO 2007/115872, page 22, line 7 to page 25, line 26. Antiredeposition agents, optical brighteners, greying inhibitors, colour transfer inhibitors are described by way of example in WO 2007/115872 on page 26, line 15 to page 28, line 2. Examples of crease protectors, antimicrobial active ingredients, germicides, fungicides, antioxidants, preservatives, antistats, ironing aids, UV absorbers are described in WO 2007/115872 on pages 28, line 14 to page 30, line 22 by way of example.

Further preferred compositions according to the invention are hair care systems.

The hair care systems according to the invention comprise further ingredients. Depending on their intended use, such compositions comprising 2 to 25% by weight of one or more washing-active surfactants from the group of anionic, non-ionic, amphoteric or zwitterionic surfactants, 0.5 to 10% by weight of one or more emulsifiers, 0.5 to 10% by weight of one or more consistency regulators, 0.5 to 10% by weight of one or more preferably cationic surfactants or emulsifiers, 0.5 to 20% by weight of one or more cosmetic oils, silicone oils or emollients, as well as customary auxiliaries and additives in customary concentrations, and additionally comprising one or more hair cosmetic active ingredients selected from the group of cationic polymers, such as, for example, quaternized cellulose and derivatives thereof, chitosan and derivatives thereof, cationic alkyl glycosides, cationic guar derivatives, polymers of dimethyldiallylammonium salts and copolymers thereof with esters and amides of acrylic acid and methacrylic acid, copolymers of vinylpyrrolidone with quaternized derivatives of dialkylaminoalkyl acrylate and methacrylate, such as, for example, vinylpyrrolidone-dimethylaminoethyl methacrylate copolymers quaternized with diethyl sulphate, vinylpyrrolidone-vinylimidazolium methochloride copolymers, terpolymers of the monomers vinylpyrrolidone, caprolactam and acrylamides, quaternized polyvinyl alcohol, and those polymers which are known under the INCI names polyquaternium-2, polyquaternium-17, polyquaternium-18, polyquaternium-27 and polyquaternium-37, cationic or non-ionic protein hydrolysates of vegetable or animal origin based on keratin, collagen, elastin, wheat, rice, soya, milk silk, maize or other silicone derivatives, such as, for example, dimethiconol or dimethicone (INCI names for polydimethylsiloxanes), and modified silicones, which can be terminally functionalized (INCI prefix Bis-) and/or graft-functionalized, examples being alkoxylsilicones and alkylsilicones with long-chain alkyl groups, polyoxyalkyl-modified silicones such as PEG/PPG-3/10 dimethicone or bis-PEG/PPG-20/20 dimethicone with or without alkyl ether group and esters thereof, such as, for example, dimethicone PEG-7 cocoate, and more multifunctionalized silicones such as, for example, cetyl PEG/PPG-10/1 dimethicone or methyleugenyl PEG-8 dimethicone, moreover silicone copolymers with acrylates, including those copolymers with and without alkyl modification, branched silicone derivatives such as dimethicone/silsesquioxane copolymer, crosslinked silicone copolymers such as dimethicone crosspolymer, alkyl dimethicone/divinyl dimethicone crosspolymer, cetearyl dimethicone crosspolymer or cetearyl dimethicone/vinyl dimethicone crosspolymer, aminofunctionalized silicone such as amodimethicone, aminopropyl dimethicone, PEG-7 amodimethicone, methoxy PEG/PPG-7/3 aminopropyl dimethicone or ionically modified silicones such as dimethicone propyl PG-betaine, vitamins, panthenol, pyrrolidonecarboxylic acid, bisabolol, plant extracts, creatin, ceramides, and UV-absorbers.

In this context, "textile care" is understood as meaning that the treated textile fabrics are given an advantageous effect, such as, for example, a textile softening effect, crease resistance, and/or the harmful or negative effects which can arise during cleaning and/or conditioning and/or wearing, such as, for example, fading, greying, etc., are reduced. Preferably, textile care is understood as meaning a textile softening effect, as is known for fabric softeners.

The invention further provides the use of the compounds of formula (1) according to the invention and/or of the process products according to the invention in textile care compositions, in particular in textile softening compositions (fabric softeners).

One advantage of the use according to the invention as softener is that the softener can impart hydrophilic properties to the fabrics treated therewith.

In particular, the compounds of formula (1) according to the invention impart to the fabrics hydrophilic properties while simultaneously achieving a good soft feel.

The invention likewise provides the use of the compounds of formula (1) according to the invention and/or of the process products according to the invention in detergents or cleaners.

An advantage of the use according to the invention in detergents or cleaners is that a textile care detergent or cleaner ("2 in 1" detergent or cleaner) is provided and it is not necessary to use two compositions (detergent or cleaner and fabric softener). It is also advantageous that a separate rinse operation is not necessary.

The invention further provides the use of the compounds of formula (1) according to the invention as softeners for fabrics. Preferred fabrics are, for example, selected from the group comprising wovens, textile wovens, knits, nonwovens, tissue (paper fibre) and/or fibres made of natural and/or synthetic raw materials and/or leather and/or hair and/or pelt. It may be advantageous if the softener is a so-called permanent softener.

The invention further provides the use of the compounds of formula (1) according to the invention and/or of the process products according to the invention in hair care systems which are able to both improve properties such as combability, softness, volume, shapeability, manageability, detanglability of undamaged and damaged hair, and/or also impart a beautiful shine to the hair. The compounds should thus demonstrate an improved or at least equally good individual effect, but together exhibit an improved combined effect of mechanical and other properties.

Particular hair care systems according to the invention are hair treatment compositions and hair aftertreatment compositions for rinsing out or for leaving in the hair, for example in shampoos with or without marked conditioning effect, conditioners, 2 in1 shampoos, rinses, hair treatments, hair masks, styling aids, styling agents, blow-drying lotions, hair-setting compositions, permanent waving compositions, hair smoothing compositions and/or compositions for colouring the hair.

The compounds, processes, compositions according to the invention, and also the use of the compounds and compositions are described by way of example without any intention of limiting the invention to these exemplary embodiments. Where ranges, general formulae or compound classes are stated, then these are intended to include not only the corresponding ranges or groups of compounds that are explicitly mentioned, but also all part ranges and part groups of compounds which can be derived by removing individual values (ranges) or compounds. Where, within the context of the present description, documents are cited, then the intention is for their content in its entirety to form part of the disclosure content of the present invention. Where content data (ppm or %) is given, then, unless stated otherwise, this is data in % by weight or weight-ppm (wppm). For compositions, the content data is based on the total composition, unless stated otherwise. Where average values are given below, then, unless stated otherwise, these are numerical averages. Where molar masses are used, then, unless expressly noted otherwise, these are weight-average molar masses Mw. Where values for viscosities are given in the context of this invention, then, unless noted otherwise, these are dynamic viscosities which can be ascertained using methods that are familiar to the person skilled in the art. Where, within the context of this invention, values for parameters are given whose methods are explained in the examples, then these methods are generally to be assumed as forming part of the description. Where measurement values are given below, then, unless stated otherwise, these measurement values were ascertained at a pressure of 1013.25 hPa and a temperature of 25° C.

Further embodiments and subjects of the invention arise from the claims, the disclosure content of which, in its entirety, is the subject matter of this description.

OPERATIVE EXAMPLES

The subject matter of the present invention is elucidated in more detail below, without any intention that the subject matter of the invention should be confined to these exemplary embodiments.

Chemicals used: N,N-dimethylaminopropylamine (99%) and diethylentriamine (99%) were obtained from Sigma-Aldrich. Hexylamine (98%) and epichlorohydrin (≥99%) were acquired from Fluka. Double metal cyanide catalyst was acquired from Bayer AG. Propylene oxide was acquired from GHC Gerling, Holz & CO Handels GmbH.

GPC Measurements:

GPC measurements for determining the polydispersity and weight average molar masses Mw were carried out under the following measurement conditions: column combination SDV 1000/10 000 Å (length 65 cm), temperature 30° C., THF as mobile phase, flow rate 1 ml/min, sample concentration 10 g/l, RI detector, evaluation of the chlorine-containing polyethers was carried out against polypropylene glycol standard (76-6000 g/mol), evaluation of the chlorine-containing polyethersiloxanes against polystyrene standard (162-2 570 000 g/mol).

Determination of the Content of Chlorine and Double Bonds:

The content of chlorine and double bonds was determined by usage of $^{13}$C-NMR spectroscopy. A NMR spectrometer of the Bruker Avance 400 type was used, the samples being dissolved in $CDCl_3$.

Determination of the SiH Content:

The determinations of the SiH values of the hydrogen siloxanes used, and also those of the reaction mixtures are carried out in each case by gas volumetry by the sodium butylate induced decomposition of sample aliquots in a gas burette. When inserted into the ideal gas equation, the measured volumes of hydrogen permit the determination of the content of active SiH functions in the starting materials and also in the reaction mixtures and thus permit reaction control.

Determination of the Iodine Number (IN):

Iodine numbers were determined in accordance with the method DGF C-V 11 a (53) of the German Society for Fat Science. For this, the samples were reacted with iodine monobromide, with the excess being converted to iodine by adding potassium iodide, and said iodine being back-titrated.

The Karstedt solutions used were platinum(0) divinyltetramethyldisiloxane complexes in decamethylcyclopentasiloxane in the concentration 0.1% by weight platinum (obtainable by Umicore with 21.37% by weight platinum, which was adjusted to 0.1% by weight Pt by dilution with decamethylcyclopentasiloxane). The doses of the catalyst given in the examples below refer to the mass sum of the initial weights of the reaction components of the hydrosilylation, added solvents are not taken into consideration in this calculation.

Example 1

Synthesis Example

Example A: Preparation of Epichlorohydrin Alkoxylation Products

Example A1: Preproduct PE 1

A 5 liter autoclave was charged with, as starter, 1109 g of poly(oxypropylene)-co-poly(oxyethylene) monoallyl ether with the mass average molar mass Mw=780 g/mol and 1.5 g of zinc hexacyanocobaltate DMC catalyst, and the mixture was heated to 130° C. with stirring. The reactor was evacuated to an internal pressure of 30 mbar in order to remove any volatile ingredients present by distillation. To activate the DMC catalyst, a portion of 75 g of propylene oxide was introduced. Following onset of the reaction and drop in internal pressure, firstly a further 332 g of propylene oxide were metered in with cooling. Then, under the same conditions, 814 g of propylene oxide and 259 g of epichlorohydrin in the form of a mixture were metered in over the course of 60 min at 130° C. and a maximum reactor internal pressure of 2.7 bar. There followed a 30 minute post-reaction at 130° C., in the course of which the internal pressure in the reactor dropped to 0.5 bar. Finally, as the end block, a further 407 g of propylene oxide were added at 130° C. After another post-reaction under the same conditions, a degasification stage followed. In this, volatile fractions such as residual propylene oxide and epichlorohydrin were distilled off in vacuo at 130° C. The nearly colourless, low viscosity chlorine containing alkoxylation product was cooled to below 90° C. and discharged from the reactor. According to GPC, the product had a weight average molar mass of 1867 g/mol, a polydispersity Mw/Mn of 1.21 and, according to $^{13}$C-NMR analysis, comprised 2 mol of Cl per molecule, IN=11.9.

Example A2: Preproduct PE 2

A 5 liter autoclave was charged with, as starter, 685.6 g of poly(oxyethylene) monoallyl ether (mass average molar mass Mw=380 g/mol) and 1.5 g of zinc hexacyanocobaltate DMC catalyst, and the mixture was heated to 130° C. with stirring. The reactor was evacuated to an internal pressure of 30 mbar in order to remove any volatile ingredients present by distillation. To activate the DMC catalyst, a portion of 60 g of propylene oxide was introduced. Following onset of the reaction and drop in internal pressure, firstly a further 454 g of propylene oxide were metered in with cooling. Then, under the same conditions, 1029 g of propylene oxide and 327 g of epichlorohydrin in the form of a mixture were metered in over the course of 2.5 hours at 130° C. and a maximum reactor internal pressure of 2.9 bar. There followed a 45-minute post-reaction at 130° C. Finally, as the end block, a further 514 g of propylene oxide were added at 130° C. After another post-reaction, a degasification stage followed in vacuo at 130° C. The virtually colourless, low viscosity chlorine-containing alkoxylation product was cooled to below 90° C. and discharged from the reactor. According to GPC, the product had a weight average molar mass of 1556 g/mol, a polydispersity Mw/Mn of 1.18 and, according to $^{13}$C-NMR analysis, comprised 2 mol of Cl per molecule, IN=15.

Example A3: Preproduct PE 3

A 5 liter autoclave was charged with, as starter, 615.6 g of poly(oxypropylene)-co-poly(oxyethylene) monoallyl ether with the mass-average molar mass Mw=780 g/mol and 2.25 g of zinc hexacyanocobaltate DMC catalyst, and the mixture was heated to 130° C. with stirring. The reactor was evacuated to an internal pressure of 30 mbar in order to remove any volatile ingredients present by distillation. To activate the DMC catalyst, a portion of 75 g of propylene oxide was introduced. Following onset of the reaction and drop in internal pressure, firstly a further 155 g of propylene oxide were metered in with cooling. Then, under the same conditions, 1469 g of propylene oxide and 439 g of epichlorohydrin in the form of a mixture were metered in over the course of 60 min at 130° C. and a maximum reactor internal pressure of 2.7 bar. There followed a 30-minute post-reaction at 130° C., in the course of which the internal pressure in the reactor dropped to 0.5 bar. Finally, as the end block, a further 230 g of propylene oxide were added at 130° C. After another post-reaction under the same conditions, a degasification stage followed. In this, volatile fractions such as residual propylene oxide and epichlorohydrin were distilled off in vacuo at 130° C. The virtually colourless, low viscosity chlorine-containing alkoxylation product was cooled to below 90° C. and discharged from the reactor. According to GPC, the product had a weight-average molar mass of 2754 g/mol, a polydispersity Mw/Mn of 1.28 and, according to $^{13}$C-NMR analysis, comprised 6 mol of Cl per molecule, IN=6.9 g iodine/100 g.

Example A4: Preproduct PE 4

A 5 liter autoclave was charged with, as starter, 1100 g of poly(oxypropylene)-co-poly(oxyethylene) monoallyl ether with the mass-average molar mass Mw=780 g/mol and 1.81 g of zinc hexacyanocobaltate DMC catalyst, and the mixture was heated to 130° C. with stirring. The reactor was evacuated to an internal pressure of 30 mbar in order to remove any volatile ingredients present by distillation. To activate the DMC catalyst, a portion of 75 g of propylene oxide was introduced. Following onset of the reaction and drop in internal pressure, firstly a further 334 g of propylene oxide were metered in with cooling. Then, under the same conditions, 818 g of propylene oxide, 508 g of butylene oxide and 391 g of epichlorohydrin in the form of a mixture were metered in over the course of 60 min at 130° C. and a maximum reactor internal pressure of 2.7 bar. There followed a 30-minute post-reaction at 130° C., in the course of which the internal pressure in the reactor dropped to 0.5 bar. Finally, as the end block, a further 409 g of propylene oxide were added at 130° C. After another post-reaction under the same conditions, a degasification stage followed. In this, volatile fractions such as residual propylene oxide and epichlorohydrin were distilled off in vacuo at 130° C. The virtually colourless, low viscosity chlorine-containing alkoxylation product was cooled to below 90° C. and discharged from the reactor. According to GPC, the product had a weight-average molar mass of 2260 g/mol, a polydispersity Mw/Mn of 1.2 and, according to $^{13}$C-NMR analysis, comprised 3 mol of Cl per molecule, IN=9.6.

Example B: Preparation of Chlorine-Containing Polyethersiloxane Copolymers by Means of Hydrosilylation

Example B1: Preproduct PES 1

A multineck flask with KPG paddle stirrer, reflux condenser, inert gas supply line and temperature sensor was charged with 199.9 g of the chlorine-containing allyl polyether PE 2 (IN=15) and heated. After adding 15 ppm of a WK catalyst at 60° C., the reaction mixture was further heated to 70° C. and, by means of a dropping funnel, admixed with 100.1 g of a hydrogen siloxane of the formula MH1 D28 MH1 (0.9 SiH eq/kg). The mixture was then heated to a reaction temperature of 80° C. and the exothermy was captured so that the reaction temperature of 90° C. was not exceeded. After one hour, no more free SiH could be detected; the conversion was complete. $^{29}$Si—NMR and $^{13}$C-NMR spectroscopic analysis produced the expected values.

Example B2: Preproduct PES 2

A multi-neck flask fitted with KPG paddle stirrer, reflux condenser, inert gas supply line and temperature sensor was charged with 144.48 g of the chlorine containing allyl polyether PE 2 (IN=15) and heated. After adding 15 ppm of a WK catalyst at 67° C., 160.86 g of a hydrogen siloxane of the formula MH1 D68 MH1 (0.39 SiH eq/kg) was added using a dropping funnel. Then, the mixture was heated to a reaction temperature of 80° C. and the exothermy was captured so that this reaction temperature was not exceeded. After 4 hours, the completeness of the reaction conversion was ascertained by means of SiH value determination. $^{29}$Si—NMR and $^{13}$C-NMR spectroscopic analysis produced the expected values.

Example B3: Preproduct PES 3

A multineck flask with KPG paddle stirrer, reflux condenser, inert gas supply line and temperature sensor was charged with 221.78 g of the chlorine-containing allyl polyether PE 2 (IN=15) and heated. After adding 15 ppm of a WK catalyst at 60° C., the reaction mixture was further heated to 70° C. and 95.4 g of a hydrogen siloxane of the formula M D'2.3 D25.7 M (1.04 SiH eq/kg) were added using a dropping funnel. Then, the mixture was heated to a reaction temperature of 80° C. and the exothermy was captured so that the reaction temperature of 90° C. was not exceeded. After one hour, the completeness of the reaction conversion was established by means of SiH value determination. $^{29}$Si—NMR and $^{13}$C-NMR spectroscopic analyses produced the expected values.

Example B4: Preproduct PES 4

A multineck flask with KPG paddle stirrer, reflux condenser, inert gas supply line and temperature sensor was charged with 151.5 g of the chlorine-containing allyl polyether PE 2 (IN=15) and heated. After adding 15 ppm of a WK catalyst at 60° C., the reaction mixture was further heated to 70° C. and 198.47 g of a hydrogen siloxane of the formula MH1 D78 MH1 (0.34 SiH eq/kg) were added using a dropping funnel. Then, the mixture was heated to a reaction temperature of 80° C. and the exothermy was captured so that this reaction temperature was not exceeded. After one hour, free SiH could no longer be detected, the conversion was complete. $^{29}$Si—NMR and $^{13}$C-NMR spectroscopic analyses produced the expected values.

Example B5: Preproduct PES 5

A multineck flask with KPG paddle stirrer, reflux condenser, inert gas supply line and temperature sensor was charged with 135.91 g of the chlorine-containing allyl polyether PE 1 (IN=11.9) and heated. After adding 15 ppm of a WK catalyst at 60° C., the reaction mixture was further heated to 70° C. and 200 g of a hydrogen siloxane of the formula MH1 D98 MH1 (0.28 SiH eq/kg) were added using a dropping funnel. Then, the mixture was heated to a reaction temperature of 80° C. and the exothermy was captured such that this reaction temperature was not exceeded. After 8 hours, free SiH could no longer be detected, the conversion was complete.

Example B6: Preproduct PES 6

A multineck flask with KPG paddle stirrer, reflux condenser, inert gas supply line and temperature sensor was charged with 48.7 g of the chlorine-containing allyl polyether PE 2 (IN=15) and heated. After adding 22.5 ppm of a WK catalyst at 50° C., the reaction mixture was further heated to 70° C. and 114 g of a hydrogen siloxane of the formula MH1 D69 (0.19 SiH eq/kg) were added using a dropping funnel. Then, the mixture was heated to a reaction temperature of 80° C. and the exothermy was captured such that this reaction temperature was not exceeded. After 10 hours, free SiH could no longer be detected, the conversion was complete.

Example B7: Preproduct PES 7

A multineck flask with KPG paddle stirrer, reflux condenser, inert gas supply line and temperature sensor was charged with 151.48 g of the chlorine-containing allyl polyether PE 2 (IN=15) and heated. After adding 15 ppm of a WK catalyst at 50° C., the reaction mixture was further heated to 70° C. and 100 g of a hydrogen siloxane of the formula PhSi (D19 MH1) (0.9 SiH eq/kg) were added using a dropping funnel. Then, the mixture was heated to a reaction temperature of 80° C. and the exothermy was captured such that this reaction temperature was not exceeded. After 1.5 hours, free SiH could no longer be detected, the conversion was complete.

Example B8: Preproduct PES8

A multineck flask with KPG paddle stirrer, reflux condenser, inert gas supply line and temperature sensor was charged with 226.37 g of the chlorine-containing allyl polyether PE 1 (IN=6.9) and heated. After adding 15 ppm of a WK catalyst at 60° C., the reaction mixture was further heated to 70° C. and 103.62 g of a hydrogen siloxane of the formula MH1 D28 MH1 (0.9 SiH eq/kg) were added using a dropping funnel. Then, the mixture was heated to a reaction temperature of 80° C. and the exothermy was captured such that this reaction temperature was not exceeded. After 8 hours, free SiH could no longer be detected, the conversion was complete. $^{29}$Si—NMR and $^{13}$C-NMR spectroscopic analysis produced the expected values.

Example B9: Preproduct PES 9

A multineck flask with KPG paddle stirrer, reflux condenser, inert gas supply line and temperature sensor was charged with 181.4 g of the chlorine-containing allyl polyether PE 4 (IN=9.6) and heated. After adding 15 ppm of a WK catalyst at 60° C., the reaction mixture was further heated to 70° C. and 68.6 g of a hydrogen siloxane of the formula MH1 D28 MH1 (0.9 SiH eq/kg) were added using a dropping funnel. Then, the mixture was heated to a reaction temperature of 80° C. and the exothermy was captured such that this reaction temperature was not exceeded. After 8 hours, free SiH could no longer be detected, the conversion was complete. $^{29}$Si—NMR and $^{13}$C-NMR spectroscopic analysis produced the expected values.

Example C: Reaction of Chlorine-Containing Polyethersiloxane Copolymers with Amines

Example C1

A multi-neck flask fitted with KPG paddle stirrer, reflux condenser, inert gas supply line and temperature sensor was charged with 100 g of the chlorine-containing polyethersiloxane PES 4 and 21 g of N,N-dimethylpropylaminopropylamine (DMAPA), and the mixture was heated to 140° C. with stirring. After a reaction time of 10 hours, the excess amine was removed on a rotary evaporator (T=105° C., p<0.1 mbar). After filtering by using a pressure filter press, a clear slightly yellow liquid product was obtained. The complete substitution of the chlorine was detected by means of $^{13}$C-NMR.

Example C2

A multineck flask fitted with KPG paddle stirrer, reflux condenser, inert gas supply line and temperature sensor was charged with 100 g of the chlorine-containing polyethersiloxane PES 1 and 32 g of DMAPA, and the mixture was heated to 140° C. with stirring. After a reaction time of 10 hours, the excess amine was removed on a rotary evaporator (T=105° C., p=2.5 mbar). After filtering by using of a pressure filter press, a clear slightly yellow liquid product was obtained. The complete substitution of the chlorine was detected by means of $^{13}$C-NMR.

Example C3

A multineck flask fitted with KPG paddle stirrer, reflux condenser, inert gas supply line and temperature sensor was charged with 100 g of the chlorine-containing polyethersiloxane PES 6 and 14.7 g of DMAPA, and the mixture was heated to 135° C. with stirring. After a reaction time of 10 hours, the excess amine was removed on a rotary evaporator (T=105° C., p<0.1 mbar). After filtering by using of a pressure filter press, a clear slightly yellow liquid product was obtained. The complete substitution of the chlorine was detected by means of $^{13}$C-NMR.

Example C4

A multineck flask fitted with KPG paddle stirrer, reflux condenser, inert gas supply line and temperature sensor was charged with 100 g of the chlorine-containing polyethersiloxane PES 2 and 22 g of DMAPA, and the mixture was heated to 140° C. with stirring. After a reaction time of 10 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C5

A multineck flask fitted with KPG paddle stirrer, reflux condenser, inert gas supply line and temperature sensor was charged with 100 g of the chlorine-containing polyethersiloxane PES 3 and 34 g of DMAPA, and the mixture was heated to 135° C. with stirring. After a reaction time of 10 hours, the excess amine was removed on a rotary evaporator (T=105° C., p<0.1 mbar). After filtering by using of a pressure filter press, a clear slightly yellow liquid product was obtained. The complete substitution of the chlorine was detected by means of $^{13}$C-NMR.

Example C6

A multineck flask fitted with KPG paddle stirrer, reflux condenser, inert gas supply line and temperature sensor was charged with 100 g of the chlorine-containing polyethersiloxane PES 7 and 28.2 g of DMAPA, and the mixture was heated to 140° C. with stirring. After a reaction time of 10 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C7

A multineck flask fitted with KPG paddle stirrer, reflux condenser, inert gas supply line and temperature sensor was charged with 200 g of the chlorine-containing polyethersiloxane PES 5 and 35.42 g of DMAPA, and the mixture was heated to 140° C. with stirring. After a reaction time of 10 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C8

A multineck flask fitted with KPG paddle stirrer, reflux condenser, inert gas supply line and temperature sensor was charged with 100 g of the chlorine-containing polyethersiloxane PES 4 and 20.13 g of n-hexylamine, and the mixture was heated to 130° C. with stirring. After a reaction time of 7 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C9

A multineck flask fitted with KPG paddle stirrer, reflux condenser, inert gas supply line and temperature sensor was charged with 100 g of the chlorine-containing polyethersiloxane PES 1 and 31.87 g of diethylenetriamine, and the mixture was heated to 150° C. with stirring. After a reaction time of 7 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C10

A multineck flask fitted with KPG paddle stirrer, reflux condenser, inert gas supply line and temperature sensor was charged with 100 g of the chlorine-containing polyethersiloxane PES 9 and 39.7 g of diethylenetriamine, and the mixture was heated to 150° C. with stirring. After a reaction time of 8 hours, the excess amine was removed on a rotary evaporator (T=105° C., p=2.4 mbar). After filtering by using of a pressure filter press, a clear slightly yellow liquid product was obtained. The complete substitution of the chlorine was detected by means of $^{13}$C-NMR.

Example C11

A multineck flask fitted with KPG paddle stirrer, reflux condenser, inert gas supply line and temperature sensor was charged with 100 g of the amino-group-functionalized polyethersiloxane from Example C2 and heated to 90° C. 10.1 g of dimethyl sulphate were added over the course of 15 min with stirring. After a reaction time of 45 minutes, the liquid and yellowish quaternized product was cooled to 50° C. and drawn off. The methylation on the amine groups was detected by means of $^{13}$C-NMR.

Example C12

A multineck flask fitted with KPG paddle stirrer, reflux condenser, inert gas supply line and temperature sensor was charged with 100 g of the amino-group-functionalized polyethersiloxane from Example C2 and heated to 90° C. 5.1 g of acetic acid were added over the course of 5 min with stirring. After stirring for 15 minutes, the liquid and yellowish product having protonated amine groups was cooled to 50° C. and drawn off.

Example 2

Compositions

Z1: General Formulation:
 5 to 50% by weight of the siloxanes according to the invention, or solutions thereof, are added, with stirring, to a mixture of 1.25 to 12.5% by weight of a lauryl alcohol ethoxylate with a degree of ethoxylation of 6-10 or of a mixture with different degrees of ethoxylation, 0.05 to 0.5% by weight of concentrated acetic acid and 37.0 to 93.7% by weight of water in a glass beaker with propeller stirrer.

Z2: Formulation Example (According to the Invention):
 20% by weight of the product of synthesis Examples C1, C3 or C4 are added with stirring to a mixture of 8.0% by weight of a lauryl alcohol ethoxylate with a degree of ethoxylation of 6 and 2.0% by weight with a degree of ethoxylation of 10, 0.4% by weight of concentrated acetic acid and 69.6% by weight of water in a glass beaker with propeller stirrer. This gives a white low viscosity formulation.

Z3: Formulation Example (not According to the Invention):
 The comparison product was prepared analogously to the preparation of the formulation according to Z2. In the comparison product, TEGO XP 6013 from Firma Evonik Industries is an amino functional silicone fluid which can be used as soft handle agent for fibres and textiles.

Z4: Formulation Example (According to the Invention):
 20 parts by weight of a product of synthesis Examples C1, C2, C4 or C5 were charged, with stirring, to a glass beaker with propeller stirrer. Then, in order, 10 parts by weight of dipropylene glycol, and 10 parts by weight of a fatty alcohol ethoxylate with a degree of ethoxylation of 6 were added thereto with stirring. Finally, the mixture is topped up to 100 parts by weight with water and after-stirred for 15 min.

Z5: Formulation Example (not According to the Invention):
 Analogous to Z4 using TEGOSIVIN® IE 11/59 (microemulsion of an amino group functional siloxane with 20% active content, trade name of Evonik Industries AG) and REWOQUAT® SQ 1 (cationic silicon derivative, trade name of Evonik Industries AG, INCI name Polyquaternium 80) instead of the compounds according to the invention.

Example 3

Applications

Application Examples
 To assess the feel (haptic evaluation) achievable when using the amino polyether siloxanes and also the achievable hydrophilicity, products consisting of native fibres were finished herewith according to the following process:

Exhaustion Process:

A1:

To examine the soft feel, knit cotton fabric (165 g/m$^2$) from wfk Testgewebe GmbH (Christenfeld 10 41379 Brüggen) and terry cotton fabric (380 g/m$^2$) from Frottana Textil GmbH & Co KG (Waltersdorfer Str. 54 02779 Großschönau) were immersed in a 0.025% strength (based on active ingredient) liquor with a liquor ratio of 1:12 for 20 min with gentle mixing, lightly wrung out and dried in the Mat this Labdryer LTE.

A2:

To examine the hydrophilicity, woven cotton fabric (200 g/m$^2$) from wfk Testgewebe GmbH (Christenfeld 10 41379 Brüggen) were immersed in a 0.025% strength (based on silicon active ingredient) liquor with a liquor ratio of 1:120 for 20 min with gentle mixing and dried in the Mat this Labdryer LTE. Drying conditions: terry cotton fabric: ca. 14 min (105° C. ambient temperature, 5 min residence time at 100° C.). Knit cotton fabric: ca. 7 min (105° C. ambient temperature, 3 min residence time at 100° C.).

A3:

A composition Z4 as described above was diluted with water of 16° German hardness to give a rinse solution which contained 0.01% by weight of product according to the invention.

The cotton cloths (25×9 cm, cotton fabric with wfl Code 13A, obtainable from wfk Testgewebe GmbH Krefeld) were immersed for 10 min in 100 ml of the rinse solution. Here, it should be ensured that the cloths are evenly wetted by the rinse solution. The cloths were then laid out to dry at room temperature.

A4:

Terry cotton fabric measuring 80 cm by 50 cm with a weight per area of ca. 350 g/m$^2$ were washed twice with heavy duty washing powder at 95° C., rinsed twice, spun and hung to dry in the air as one layer on a line.

A composition Z4 as described above was diluted with cold tap water to give a rinse solution which contained 0.025% by weight of compound according to the invention. The cotton cloths were immersed for 10 min in 2 liters of the rinse solution. Here, it should be ensured that the cloths are wetted evenly by the rinse solution. The cloths were then spun and hung up to dry at room temperature in a single layer on a line. The treated terry cotton cloths were cut into 10 equal sections measuring 16 cm by 25 cm.

Feel Assessment:

G1:

To assess the fabric feel, an experienced team of 6 people was gathered together which assessed the anonymized feel samples of the knit and terry fabrics finished with the emulsions with the aid of a hand panel test. The feel samples of knit fabric additionally included an untreated sample not overtly labelled, which had been treated analogously only with water.

Qualification took place by reference to the values +++ excellent, ++ very good, + good, o satisfactory, – poor. The results are listed in Tables 1 and 2.

G2:

To assess the soft feel, an experienced team of 9 test persons was gathered together which assessed the anonymized feel samples of the cotton fabric finished with the formulations with the aid of a hand panel test. Here, each test person was given their own cotton cloth. The feel samples always additionally included an untreated sample (blank value) not overtly labelled.

Assessment was made on a scale of 0 (hard and unpleasant in feel) to 5 (soft and pleasant in feel) with the option of whole numbered interim values.

To assess the soft feel, the individual evaluations were summed, meaning that for 9 test persons a maximum soft feel of 45 could result. The results are listed in Table 4.

Testing the Hydrophilicity:

H1:

The hydrophilicity was assessed using the test method for measuring the height of rise of water in accordance with DIN 53924. The measurements are always carried out relative to a comparison sample and for this reason a climatically controlled environment is unnecessary. Comparison is only ever within one measurement series. For this, the finished woven cotton test fabric is cut into five strips each 25 cm in length and 1.5 cm in width, which are marked at the sides using a water-soluble pen and secured in a taut perpendicular position, but without tension, to a holder. The holder is then placed for 5 minutes in a water bath such that 2 cm of the strips dip into the water. The water soluble marking serves to better make out the height of rise as a result of the colour spreading upon wetting with water. After the holder has stood outside the water bath for 10 minutes, the height of rise is read off in cm and determined against the blank value (height of rise of the untreated cotton strips×cm=100%) and reported as a % of the blank value.

The results are given in Table 3

H2:

The hydrophilicity was assessed using the internal test method for measuring the height of rise of water in accordance with DIN 53924.

For this, the finished cotton fabric was cut into five strips each 25 cm in length and 1.5 cm in width, which were marked with a water-soluble pen and secured in a taut perpendicular position, but without tension, to a holder. The holder was then placed into a water bath for 5 minutes such that 2 cm of the strip dipped into the water. After the holder had stood outside of the water bath for 10 minutes, the height of rise was read off in mm and determined against the blank value (height of rise of the untreated cotton strips×mm=100%) and reported as a % of the blank value.

The results are given in Table 5.

TABLE 1

Soft feel assessment as per Example 3 after application A1 of the compositions as per Example 2 to knit cotton fabric

| Composition | Feel quality |
| --- | --- |
| Z2/C3 | ++ |
| Z2/C4 | +++ |
| Z2/C1 | +++ |
| Z3 (TEGO XP 6013) | +++ |
| Untreated | – |

TABLE 2

Soft feel assessment as per Example 3 after application A1 of the compositions as per Example 2 on terry cotton fabric

| Composition | Feel quality |
| --- | --- |
| Z2/C1 | +++ |
| Z2/C3 | ++ |
| Z2/C4 | +++ |
| Z3 (TEGO XP 6013) | +++ |
| Untreated | – |

TABLE 3

Determination of the height of rise as per Example 3 after application A2 of the compositions as per Example 2 to woven cotton fabric

| Composition | Height of rise in % of blank value |
|---|---|
| Z2/C1 | 90.5 |
| Z2/C3 | 89.7 |
| Z2/C4 | 91.4 |
| Z3 (TEGO XP 6013) | 77.6 |
| Untreated | 100.0 |

Tables 1, 2 and 3 show that the compositions according to the invention comprising the aminopolyether siloxanes according to the invention achieve not only a very good soft feel, but also an improved rewettability and thus improved hydrophilicity compared to soft feel agents in the prior art.

TABLE 4

Soft feel assessment as per Example 3 after application A4 of the compositions as per Example 2 to knit cotton fabric

| Composition | Soft feel |
|---|---|
| Z4/C1 | 32 |
| Z4/C4 | 30 |
| Z5 (REWOQUAT SQ1) | 32 |
| Untreated | 0 |

TABLE 5

Determination of the height of rise as per Example 3 after application A3 of the compositions as per Example 2 to woven cotton fabric

| Composition | Height of rise in % of blank value |
|---|---|
| Z4/C1 | 88 |
| Z4/C2 | 87 |
| Z4/C4 | 84 |
| Z4/C5 | 94 |
| Z5 (TEGOSIVIN IE 11/59 XP 6013) | 77 |
| Untreated | 100.0 |

The data in Tables 5 and 4 clearly reveals that the products according to the invention not only have the improved rewettability, but also a comparable soft feel compared with a cationic silicone as soft feel agent of the prior art.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A polysiloxane polyether copolymer with amino groups and/or quaternary ammonium groups in the polyether moiety;
   wherein the amino groups and/or quaternary ammonium groups are bonded directly to a carbon of the polyoxyalkylene chain via a methylene group;
   wherein the polysiloxane polyether copolymer is of the formula (1):

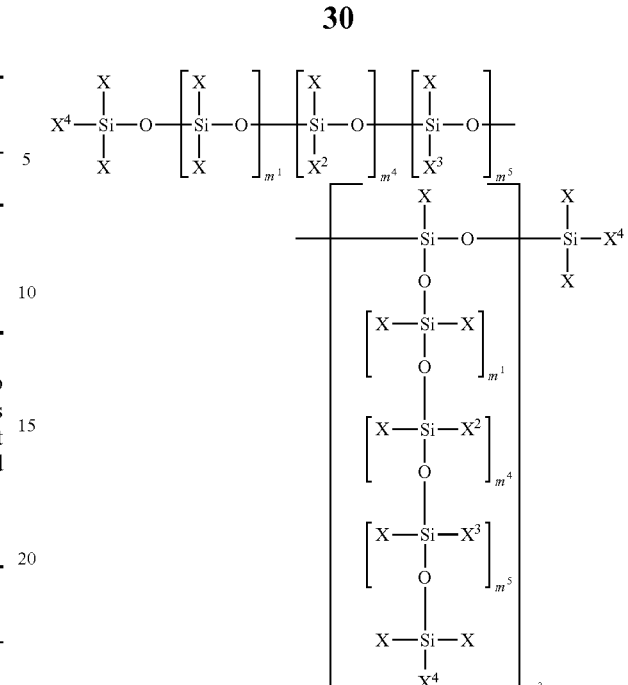

wherein:
   m1 is from 0 to 500;
   m3 is from 0 to 30;
   m4 is from 0 to 60; and
   m5 is from 0 to 60;
   with the proviso that the sum of the indices m1, m3, m4, and m5 is at least equal to 1; and
wherein:
   X independently of the others is a linear, cyclic, or branched, aliphatic or aromatic, saturated or unsaturated hydrocarbon radical having 1 to 20 carbon atoms which optionally contains heteroatoms;
   X4 is alternatively X, X2, and/or X3;
   X2 is a polyether radical of the formula (1a):

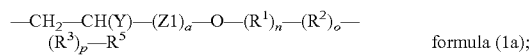

wherein:
      Y is either hydrogen or a monovalent organic radical having at least one carbon atom;
      Z1 is a divalent saturated or unsaturated organic radical;
      a is 0 or 1;
      n is 0 to 200;
      o is 1 to 1000;
      p is 0 to 200;
      with the proviso that the sum of the indices n+o+p is at least 3; and
   wherein:
      $R^1$=—$CH_2CH_2O$—;
      $R^2$=—$CH_2CH(CH_3)O$— or —$CH(CH_3)CH_2O$—;
      $R^3$=—$CH_2CHRO$— or —$CHRCH_2O$—;
      R independently of the others is an alkyl group having 2-18 carbon atoms or an aromatic radical;
      $R^5$ independently of the others=hydrogen, an alkyl group having 1-18 carbon atoms or a group $R_E$—C(=O)—; and
      $R_E$ independently of the others is an alkyl group having 1-17 carbon atoms or an aromatic radical; and
   X3 is a polyether radical of the formula (1b):

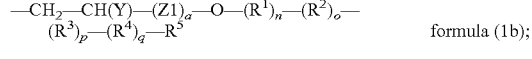

where:
- q is 1 to 50;
- $R^4$=—$CH_2CH(CH_2W)O$— or —$CH(CH_2W)CH_2O$—;
- a, n, o, p, $R^1$, $R^2$, $R^3$, $R^5$, Y, Z1 have the meanings defined above; and
- where W is a group having nitrogen;

with the proviso that m5 is at least 1 when X4 is not the same as X3.

2. The polysiloxane polyether copolymer according to claim 1;
wherein W is a group which is bonded via a nitrogen.

3. The polysiloxane polyether copolymer according to claim 1;
wherein W satisfies the formula (6):

—$NR^{N1}R^{N2}$     formula (6);

wherein $R^{N1}$ and $R^{N2}$, independently of one another, are:
hydrogen; or
a linear, cyclic or branched, aliphatic, or aromatic, saturated or unsaturated hydrocarbon radical having 1 to 20 carbon atoms, which optionally contains one or more heteroatoms.

4. The polysiloxane polyether copolymer according to claim 1;
wherein W satisfies the formula (6):

—$NR^{N1}R^{N2}$     formula (6);

wherein the radicals $R^{N1}$ and $R^{N2}$, together with the nitrogen to which they are bonded, form a mono-, bi-, or tricyclic aliphatic ring system with 3 to 10 ring members, and wherein the atoms forming ring members are selected from the group consisting of carbon, nitrogen, and oxygen.

5. A process for preparing the polysiloxane polyether copolymer according to claim 1 with amino groups and/or quaternary ammonium groups in the polyether moiety, comprising the steps of:
(i) hydrosilylating at least one chloromethyl-group-containing terminally-unsaturated polyether;
(ii) substituting the chlorine atoms by amino groups of a radical having nitrogen; and
optionally (iii) converting at least one nitrogen atom to a quaternary ammonium group.

6. The process according to claim 5;
wherein the polyether in step (i) is of formula (3), and is reacted with at least one hydrogen siloxane of formula (2) using a catalyst which favors the hydrosilylation;
wherein formula (3) is:

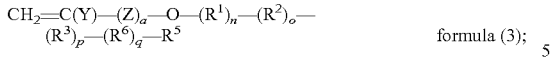

$CH_2=C(Y)$—$(Z)_a$—O—$(R^1)_n$—$(R^2)_o$—$(R^3)_p$—$(R^6)_q$—$R^5$     formula (3);

where:
- a is 0 or 1;
- n is 0 to 200;
- o is 1 to 1000;
- p is 0 to 200;
- q is 1 to 50;
- $R^1$=—$CH_2CH_2O$—;
- $R^2$=—$CH_2CH(CH_3)O$— or —$CH(CH_3)CH_2O$—;
- $R^3$=—$CH_2CHRO$— or —$CHRCH_2O$—;
- $R^5$ independently of the others=hydrogen, an alkyl group having 1-18 carbon atoms, or a group $R_E$—C(=O)—;
- Y is either hydrogen or a monovalent organic radical having at least one carbon atom;
- Z is a divalent saturated or unsaturated organic radical;
- $R^6$=—$CH_2CH(CH_2Cl)O$— or —$CH(CH_2Cl)CH_2O$— with the proviso that the sum of the indices n+o+p+q is at least equal to 3; and
wherein formula (2) is:

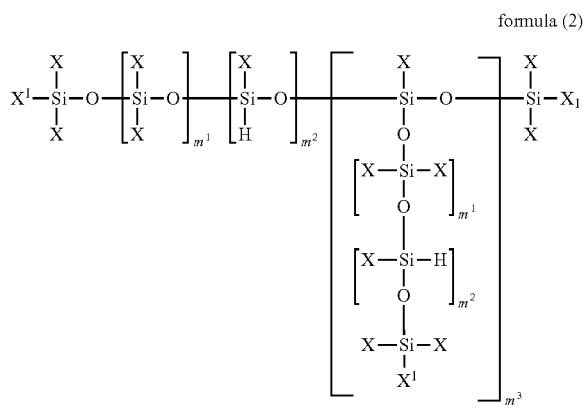

formula (2)

where:
- m1 is from 0 to 500;
- m3 is from 0 to 30;
- X independently of the others is a linear, cyclic, or branched, aliphatic or aromatic, saturated or unsaturated hydrocarbon radical having 1 to 20 carbon atoms which optionally contains heteroatoms;
- X1 is alternatively X or H;
- m2 is an integer from 0 to 60;
- with the proviso that m2 is at least 1 when X1 is not the same as H.

7. The process according to claim 5;
wherein in step (ii) the products of step (i) are reacted with at least one amine compound of formula (6a):

H—$NR^{N1}R^{N2}$     formula (6a);

where $R^{N1}$ and $R^{N2}$ independently of one another, are:
hydrogen; or
a linear, cyclic, or branched, aliphatic or aromatic, saturated or unsaturated hydrocarbon radical having 1 to 20 carbon atoms, which optionally contains one or more heteroatoms, with substitution of at least one chlorine atom.

8. The process according to claim 7;
wherein the substitution proceeds without elimination to give unsaturated compounds.

9. The process according to claim 5 optionally
wherein in step (iii) the product from step (ii) is further reacted with formation of at least one ammonium group, where the reaction leads to the formation of quaternary compounds.

10. A composition comprising:
polysiloxane polyether copolymers with amino groups and/or quaternary ammonium groups in the polyether moiety according to claim 1.

11. The composition according to claim 10, further comprising:
additives and auxiliaries.

12. A method comprising:
utilizing the compositions according to claim 10 to soften textile fabrics.

13. The method according to claim 12;
wherein the softener imparts hydrophilic properties to the fabrics treated therewith.

14. The polysiloxane polyether copolymer as claimed in claim 1, wherein the polysiloxane polyether copolymer is of the formula (1):

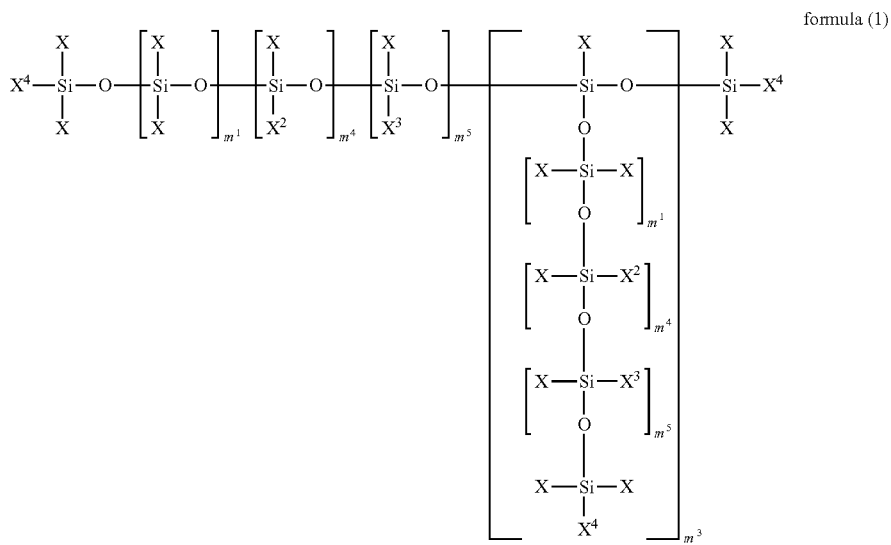

formula (1)

wherein:
m1 is from 15 to 100;
m3 is from 1 to 3;
m4 is 0;
m5 is from 2 to 4;
wherein:
X independently of the others is a linear, cyclic, or branched, aliphatic or aromatic, saturated or unsaturated hydrocarbon radical having 1 to 20 carbon atoms which optionally contains heteroatoms;
X4 is alternatively X, X2 and/or X3;
X2 is a polyether radical of the formula (1a):

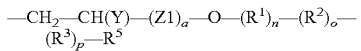 formula (1a);

wherein:
Y is hydrogen;
Z1 is methylene;
a is 1;
n is 0 to 20;
o is 15 to 80;
p is 0 to 5;
with the proviso that the sum of the indices n+o+p is at least 3; and
wherein:
$R^1$=CH$_2$CH$_2$O—;
$R^2$=—CH$_2$CH(CH$_3$)O— or —CH(CH$_3$)CH$_2$O—;
$R^3$=—CH$_2$CHRO— or —CHRCH$_2$O—;
R independently of the others is an alkyl group having 2-18 carbon atoms or an aromatic radical;

$R^5$ is hydrogen;
$R_E$ independently of the others is an alkyl group having 1-17 carbon atoms or an aromatic radical; and
X3 is a polyether radical of the formula (1b):

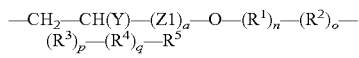 formula (1b);

where:
q is 1 to 10;
$R^4$=—CH$_2$CH(CH$_2$W)O— or —CH(CH$_2$W)CH$_2$O—;
a, n, o, p, $R^1$, $R^2$, $R^3$, $R^5$, Y, Z1 have the meanings defined above; and
W is 3-(3-dimethylamino)propylamino, 2-(2-aminoethyl)aminoethylamino, or n-hexylamine;
with the proviso that m5 is at least 1 when X4 is not the same as X3.

15. The polysiloxane polyether copolymer as claimed in claim 1;
wherein W satisfies the formula (6):

—NR$_{N1}$R$^{N2}$ 

wherein $R^{N1}$ and $R^{N2}$, independently of one another, are hydrogen; or
a linear, cyclic, or branched, aliphatic or aromatic, saturated or unsaturated, linear alkyl radical having 2 to 8 carbon atoms, where the alkyl radicals optionally are interrupted by heteroatoms, where the heteroatoms.

* * * * *